3,337,622
PROCESS FOR THE PREPARATION OF ACID HALIDES

Thomas K. Brotherton, Charleston, W. Va., assignor to Union Carbide Corporation, a corporation of New York
No Drawing. Filed July 2, 1964, Ser. No. 380,035
5 Claims. (Cl. 260—544)

This invention relates to a novel, improved process for the preparation of acid halides. In one aspect, this invention relates to a novel, improved process for the preparation of acid chlorides from acid anhydrides in the presence of certain iron catalysts. In a further aspect, the invention relates to a novel process for the preparation of fumaroyl chloride from maleic anhydride in the presence of ferric chloride.

Heretofore, acid halides, particularly the halides of dicarboxylic acids, have been prepared by a variety of known methods. Fox example, it has been reported in the literature that fumaroyl chloride was first prepared by the reaction of fumaric acid with phosphorous pentachloride or thionyl chloride. Maleic acid has also been reacted with phosphorous pentachloride to give the fumaroyl chloride. More recently, fumaroyl chloride has been prepared by reacting phosgene with fumaric acid in the presence of a formamide catalyst. Additionally, it has been reported that acid chlorides have been prepared from the corresponding acid anhydrides by the reaction with phosgene in the presence of alkali and alkaline earth metals. However, each of the aforementioned procedures has not been without its disadvantages. In most instances, the yields of the desired acid halide obtained by the known method have not been economically attractive for commercial operation. Additionally, many of the processes require the use of special equipment, or separation techniques or recovery methods which detract from the efficiency and overall cost of the process.

It is therefore an object of this invention to provide a novel improved process for the preparation of acid halides. Another object of this invention is to provide a novel improved process for the preparation of acid chlorides from acid anhydrides and phosgene in the presence of an iron catalyst. A further object of this invention is to provide a novel improved process for the preparation of acid chlorides in relatively high yields and efficiency. These and other objects will readily become apparent to those skilled in the art in the light of the teachings herein set forth.

In its broad aspect, the invention relates to an improved process for the preparation of acid halides, particularly acid chlorides such as fumaroyl chloride. The improved process comprises contacting an acid anhydride with phosgene in the presence of a catalytic amount of certain iron catalysts. The process of the invention can be illustrated by the following reaction:

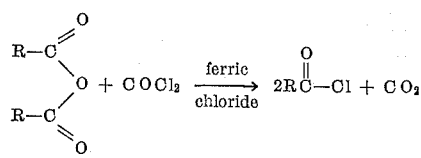

wherein each R represents a hydrocarbon group, or both R's taken together can form a ring system with the two carbon atoms to which they are attached. In those instances wherein the R groups are part of a ring system, for example, maleic anhydride, the resulting acid halide groups will, of course, be attached to the same molecule. When taken together, the R's can represent alkylene, alkenylene, cycloalkylene, cycloalkenylene, arylene or like divalent radicals. The number of carbon atoms in the R groups is preferably from 1 to 24 and more preferably from 1 to 12.

By conducting the reaction in the manner hereinafter indicated, it has been found that the desired acid halide can be conveniently obtained in yields as high as 90 percent, and higher. In contrast, the known methods of the prior art provide relatively low yields or suffer from one or more disadvantages which renders them largely unsuitable for efficient and economic operation.

It has been observed that the yield of the desired acid halide obtained by the process of this invention is critically dependent upon both the particular catalyst employed and the ratio of reactants. Each of these two factors are determinative of the yield and efficiency with which the acid halide is produced.

Experimental data has confirmed that only iron compounds are effective for catalyzing the acid anhydride-phosgene reaction to the desired high yields and efficiency. Compounds such as tungsten chloride, phosphorous chloride, ruthenium chloride hydrate, vanadium chloride, aluminum chloride, copper-cuprous chloride mixtures, cobalt chloride, nickel chloride, titanium chloride, boron trifluoride, chromium chloride, stannic chloride and sulfuric acid, have ben found to lack the necessary catalytic activity required to effectively catalyze the reaction to the desired high yield of acid halide. In most instances, yields of less than 10 percent were obtained and generally accompanied by high residue formation. This was indeed unexpected and surprising since many of these compounds normally exhibit catalytic properties similar to those of iron compounds.

While not wishing to be bound to any particular mechanism, it is believed that the catalytic activity of the iron compounds employed in the instant invention, particularly ferric chloride, can be attributed, in part, to the formation of soluble complexes of a type not formed with other metal halides, as well as favorable solubility characteristics. For instance, it was observed that stannic chloride formed an insoluble complex with fumaroyl chloride. Although aluminum chloride was soluble in fumaroyl chloride, infrared analysis indicated the existence of a complex unlike that of the ferric chloride.

The second critical feature of the instant process is the ratio of phosgene to acid anhydride. Experimental evidence obtained from running the reaction under optimum conditions (2 percent $FeCl_3$ and 140° C. for 8 hours) indicated that when an equal molar ratio of, for example, maleic anhydride to phosgene is employed, the yield of the desired fumaroyl chloride is only 21 percent. In marked contrast, when a 400 percent excess of phosgene was employed under the same conditions a 90 percent yield of fumaroyl chloride was obtained. Hence, it is a critical feature of the present invention that the molar ratio of chlorinating agent to anhydride be at least about 4 to 1.

In its most highly preferred embodiment, the present invention is directed to the preparation of fumaroyl chloride from maleic anhydride and phosgene. By the process of this invention, fumaroyl chloride can be obtained in yields as high as 90 percent and higher, based on the weight of the maleic anhydride, and at quantitative maleic anhydride efficiency. However, the process is useful in the synthesis of other acid halides, particularly acid chlorides. For example, in addition to fumaroyl chloride, acetyl chloride, and phthaloyl chloride can be prepared in high yields from acetic anhydride, and phthalic anhydride.

Illustrative acid anhydrides which can be employed include, among others, 5-norbornene-2,3-dicarboxylic anhydride, pyromellitic dianhydrate, glutaric anhydride, propionic anhydride, 2-methylpropionic anhydride, 3-methylpentanoic anhydride, ethanoic propanoic anhydride, butanoic propanoic anhydride, propanoic 2-methylpropanoic anhydride, ethanoic 3-methylpentanoic anhydride, and the like.

Upon reaction with phosgene in accordance with the teachings of the instant invention, the aforementioned anhydrides give, respectively, 5-norborene-2,3-dicarbonyl chloride, pyromellitoyl tetrachloride, glutaroyl dichloride, propanoyl chloride, 2-methylpropanoyl chloride, 3-methylpentanoyl chloride, mixture of ethanoyl and propanoyl chloride, mixture of propanoyl and butanoyl chloride, mixture of propanoyl and 2-methylpropanoyl chloride, mixture of ethanoyl and 3-methylpentanoyl chloride, and the like.

Other suitable acid anhydrides which can be employed, include chloromaleic anhydride, chlorendic anhydride, isobutyric anhydride, 3-methylpentanoic anhydride, and the like.

The only catalysts which have been found suitable for use in the process of the present invention to provide the indicated high yields and efficiency, as hereinbefore indicated, are certain inorganic and organic iron compounds. In the absence of an iron catalyst and at temperatures up to 200° C., little or no reaction was observed between maleic anhydride and phosgene, and nearly quantitative recovery of starting materials was realized. Moreover, not all iron compounds are effective in promoting the reaction. For example, iron powder was ineffective even after 18 hours at 140° C.

In practice, the iron catalysts which have been found particularly suitable are the iron halides, e.g., ferrous chloride, anhydrous ferrous chloride, ferric chloride, anhydrous ferric chloride, ferrous bromide, anhydrous ferrous bromide, ferric bromide, anhydrous ferric bromide and the like; the iron alkanoates, particularly those of from 1 to 10 carbon atoms, e.g., ferrous formate, ferric formate, ferrous acetate, ferric acetate, ferrous oxalate, ferric oxalate, ferrous lactate, ferric lactate, and the like, and the iron nitrates, e.g., ferrous nitrate, ferric nitrate, and the like.

In practice, the iron catalyst is employed in a catalytic amount. By the term "catalytic amount" is meant that quantity of catalyst which will effectively catalyze the reaction between the acid anhydride and phosgene to give the desired acid halide in high yields. In general, it has been found that a catalyst concentration, based on the weight of the anhydride, of from about 0.1 to about 10 percent, and more preferably from about 1 to about 4 percent is satisfactory. Catalyst concentrations above and below the aforementioned ranges can also be employed but are less preferred. If desired, and depending upon the manner in which the reaction is carried out, the catalyst can be employed on an inert carrier, such as a molecular sieve, or other porous material.

The improved process of the present invention can be conducted in either the liquid or vaporous phase. Moreover, the process can be effected in either a batch or continuous manner. For example, the reactants can be fed continuously to a stainless steel tubular reactor containing the catalyst on an inert support and equipped with the necessary temperature and pressure controls. The desired residence time can be conveniently achieved by controlling the rate of reactants through the reactor.

Pressure is not necessarily critical and the reaction can be effected at atmospheric, subatmospheric, or superatmospheric pressures. For example, it was observed that a suitable pressure range is from about atmospheric to about 1000 pounds per square inch, while the preferred pressure range is from about atmospheric to about 500 pounds per square inch.

The operative temperature range for obtaining maximum yields of the desired acid halides is from about 50° C. to about 350° C. with the preferred range being from approximately 75° to about 250° C. However, due to the particular catalysts and controlled mole ratio of reactants, the desired high yields and efficiency can be obtained at temperatures below 150° C. In contrast, many of the known methods require temperatures of from 200° to 300° C., and higher, in order to obtain even small yields of acid halide.

Reaction times of from several seconds to 12 hours are thoroughly practicable with the preferred range being from 1 minute to about 5 hours. Shorter or longer periods can also be seasibly employed depending upon the temperature (higher temperatures usually permit the use of shorter reaction times), the acid anhydride, and the manner in which the process is conducted, i.e., batchwise or as a continuous process.

A variety of inert, organic solvents can optionally be employed as diluents in the practice of the instant process, i.e., saturated aliphatic hydrocarbons, aromatic hydrocarbons, saturated aliphatic ethers, saturated cycloaliphatic ethers, and halogen substituted saturated aliphatic hydrocarbons. The presence of a solvent is most desirable, although not essential to control the reaction where a batch process is employed. The amount of solvent present can vary within wide limits, and while amounts up to about ten percent by volume of the total charge are usually preferred, amounts in excess of this can be employed. Thus, this limit is one, rather, of economic practicability. It is noted that the amount of diluent employed will also vary with the particular reactants and the manner in which the process is conducted.

The following examples are illustrative:

EXAMPLE 1

To a three-liter Adkins-type rocker bomb there was charged 98 grams of maleic anhydride, 625 grams of phosgene and 2.1 grams of anhydrous ferric chloride. The bomb was then heated at 140° C. for 8 hours. An autogenous pressure of 450 pounds per square inch was observed. Thereafter, the bomb and contents were cooled and vented before discharging the reaction products. About 172 grams of the reaction product was charged to a still and fumaroyl chloride removed as the fraction boiling between 60° and 70° C. at 15 millimeters of mercury pressure. 137 grams of fumaroyl chloride were obtained which represented an 89 percent yield.

EXAMPLE 2

In order to demonstrate the criticality of the iron catalysts in the process of the instant invention, a different metal halide, anhydrous molybdenum pentachloride, was employed.

A three-liter Adkins-type rocker bomb was charged with 98 grams of maleic anhydride, 629 grams of phosgene and 201 grams of anhydrous molybdenum pentachloride. The bomb and contents were heated to 140° C. for a period of 8 hours. An autogenous pressure of 410 pounds per square inch was obtained. Thereafter, the bomb and contents were cooled and vented before discharging the reaction product. About 142 grams of the reaction product was charged to a still and fumaroyl chloride removed as the fraction between 70° and 95° C. at 11 millimeters of pressure. 59 grams of fumaroyl chloride was collected which corresponded to a 38 percent yield.

EXAMPLES 3–25

To further demonstrate the criticality of the iron catalysts in the process of the instant invention, various other compounds which are known to have similar catalytic properties to, for example, ferric chloride, were employed in the maleic anhydride-phosgene reaction. The equipment and procedure were essentially the same as that used in Example 2. The results of the experiments are set forth in Table I below:

TABLE I.—MALEIC ANHYDRIDE-PHOSGENE REACTION IN PRESENCE OF NON-IRON CATALYSTS

| Example | Moles M.A.[1] | Moles Phosgene | Catalyst | Percent Cat.[2] | Solvent | Temp., °C. | Pres., p.s.i. | Hours | Percent Yield |
|---|---|---|---|---|---|---|---|---|---|
| 3 | 1 | 2.3 | $AlCl_3$ | 2.0 | F.C.[3] | 110 | 150 | 8 | No Reaction. |
| 4 | 1 | 6.2 | $AlCl_3$ | 2.0 | None | 150 | 425 | 8 | 12.9. |
| 5 | 1 | 5.4 | $AlCl_3$ | 2.0 | Nit. Benz.[4] | 140 | 290 | 8 | No Reaction. |
| 6 | 1 | 5.6 | $BF_3$ | 2.0 | None | 150 | 400 | 8 | 5.0. |
| 7 | 1 | 3.2 | $ZnCl_2$ | 1.0 | do | 200 | 525 | 10 | 14.3. |
| 8 | 1 | 2.2 | $ZnCl_2$ | 5.0 | F.C. | 100 | 110 | 8 | No Reaction. |
| 9 | 1 | 2.3 | $TiCl_4$ | 2.0 | F.C. | 150 | 235 | 8 | 3.5. |
| 10 | 1 | 7.0 | $SnCl_4$ | 2.0 | None | 140 | 345 | 8 | No Reaction. |
| 11 | 1 | 2.5 | $CrCl_3$ | 2.0 | F.C. | 150 | 215 | 8 | Do. |
| 12 | 1 | 1.6 | $CoCl_2$ | 5.0 | F.C. | 100 | 110 | 8 | Do. |
| 13 | 1 | 2.0 | $Co_2(CO)_8$ | 2.0 | F.C. | 100 | 135 | 8 | Do. |
| 14 | 1 | 2.3 | $Co_2(CO)_8$ | 2.0 | F.C. | 150 | 250 | 8 | Do. |
| 15 | 1 | 1.6 | $ZnCl_2$ | 5.0 | F.C. | 100 | 105 | 8 | Do. |
| 16 | 1 | 2.3 | Ru | 2.1 | F.C. | 150 | 235 | 8 | Do. |
| 17 | 1 | 2.5 | $SiO_2$-$Al_2O_3$ | 10.0 | F.C. | 150 | 315 | 8 | Do. |
| 18 | 1 | 5.3 | $Cu$-$Cu_2Cl_2$ | 2.0 | None | 150 | 400 | 8 | Do. |
| 19 | 1 | 6.3 | $I_2$ | 2.0 | do | 140 | 360 | 8 | Trace. |
| 20 | 1 | 6.2 | DMA[5] | 2.4 | do | 150 | 400 | 8 | Do. |
| 21 | 1 | 1.6 | $NiCl_2 \cdot 6H_2O$ | 5.0 | F.C. | 100 | 110 | 10 | None. |
| 22 | 1 | 6.2 | $WCl_6$ | 2.0 | | 140 | 380 | 8 | Do. |
| 23 | 1 | 6.6 | $PCl_5$ | 2.0 | | 140 | 380 | 8 | Do. |
| 24 | 1 | 7.3 | $RuCl_3 \cdot XH_2O$ | 2.5 | | 140 | 400 | 8 | Do. |
| 25 | 1 | 6.2 | $VCl_3$ | 2.5 | | 140 | 380 | 8 | Do. |

[1] Maleic anhydride. [2] By weight based on maleic anhydride. [3] Fumaroyl chloride. [4] Nitrobenzene. [5] N,N-dimethylaniline.

EXAMPLES 26–35

In order to demonstrate the criticality of the ratio of reactants to the successful practice of this present invention, several experiments were conducted at varying concentrations of maleic anhydride and iron catalysts. Unless otherwise indicated, the reaction was conducted at 140° C. for a period of eight hours. The results of the experiments are set forth below in Table II:

TABLE II.—MALEIC ANHYDRIDE-PHOSGENE REACTION IN PRESENCE OF IRON COMPOUNDS

| Example | Molar Ratio[1] | Cat. | Percent Cat.[2] | Temp., °C. | Pres., p.s.i. | Hours | Percent Yield[3] | Percent Eff. |
|---|---|---|---|---|---|---|---|---|
| 26 | 6.2 | $FeCl_3$ | 2.1 | 140 | 450 | 8 | 89 | 95.7 |
| 27 | 6.1 | $FeCl_3$ | 2.0 | 140 | 400 | 8 | 90 | 92.9 |
| 28 | 4.7 | $FeCl_3$ | 2.0 | 140 | 415 | 8 | 82 | 90 |
| 29 | 2.0 | $FeCl_3$ | 2.0 | 130 | 210 | 8 | 47 | 89 |
| 30 | 2.7 | $FeCl_3$ | 2.0 | 120 | 225 | 8 | 55 | 79 |
| 31 | 1.5 | $FeCl_3$ | 5.0 | 110 | 181 | 8 | 56 | 75 |
| 32 | 1.6 | $FeCl_3$ | 5.0 | 100 | 145 | 8 | 48 | 83 |
| 33 | 6.28 | $FeCl_2 \cdot 6H_2O$ | 2.0 | 140 | 390 | 8 | 84.8 | 84.8 |
| 34 | 6.1 | $Fe(CO)_4Br_2$ | 2.0 | 140 | 450 | 8 | 83.0 | |
| 35 | 1.8 | Fe Pwdr. | 0.5 | 140 | 180 | 18 | No Reaction | |

[1] Phosgene to maleic anhydride. [2] By weight based on maleic anhydride. [3] Based on anhydride.

Although the invention has been illustrated by the preceding examples, it is not to be construed as limited to the materials employed therein, but rather the invention encompasses the generic area as hereinbefore disclosed. Various modifications and embodiments of this invention can be made without departing from the spirit and scope thereof.

What is claimed is:

1. In a process for the preparation of acid chlorides by reaction of phosgene with an acid anhydride the improvement comprising contacting phosgene and an acid anhydride of the formula:

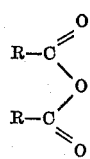

wherein each R individually represents a hydrocarbon group of from 1 to 24 carbon atoms and the two R's taken together can form a carbocyclic ring with the carbon atoms to which they are attached, in the presence of a catalytic amount of an iron compound selected from the group consisting of iron halides and iron carbonyl halides, said phosgene and acid anhydride being present in a respective mole ratio of at least about 4 to 1.

2. The improved process of claim 1 wherein each R individually represents a hydrocarbon group of from 1 to 12 carbon atoms.

3. The improved process of claim 1 wherein the acid anhydride is maleic anhydride.

4. The improved process of claim 1 wherein the iron compound is ferric chloride.

5. The improved process of claim 1 wherein the acid anhydride is maleic anhydride, the iron compound is ferric chloride, and the reaction is effected at a temperature of about 75° C. to about 250° C.

References Cited

UNITED STATES PATENTS 2,051,096  8/1936  Mares _____ 260—544

FOREIGN PATENTS 785,075  2/1935  France.

OTHER REFERENCES

Hill, "J. Org. Chem." vol. 25 (1960) pages 1115–1118.
Houben-Weyl, Der Methoden der Organischen Chemie, vol. 8 (1952) pages 469–472.

LORRAINE A. WEINBERGER, *Primary Examiner.*

RICHARD K. JACKSON, *Examiner.*